US011187198B1

(12) United States Patent
Copley et al.

(10) Patent No.: US 11,187,198 B1
(45) Date of Patent: Nov. 30, 2021

(54) CLAMPING ASSEMBLY FOR A PAIR OF FUEL LINES AND COMPONENTS, SYSTEMS, AND METHODS THEREOF

(71) Applicant: Caterpillar Inc., Peoria, IL (US)

(72) Inventors: Shaun M. Copley, Lafayette, IN (US); Brian Kenadjian, Lafayette, IN (US); Kulbir S. Rana, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/016,086

(22) Filed: Sep. 9, 2020

(51) Int. Cl.
*F02M 37/00* (2006.01)
*F16L 3/12* (2006.01)

(52) U.S. Cl.
CPC ........ *F02M 37/0011* (2013.01); *F16L 3/1211* (2013.01)

(58) Field of Classification Search
CPC F02M 37/0011; F02M 37/0017; F16L 3/1211
See application file for complete search history.

(56) References Cited

U.S. PATENT DOCUMENTS

| | | | | |
|---|---|---|---|---|
| 5,054,445 A | * | 10/1991 | Henkel | .................. F02M 45/04 123/300 |
| 6,691,381 B2 | | 2/2004 | Scollard et al. | |
| 9,453,485 B2 | | 9/2016 | Masti et al. | |
| 9,863,388 B2 | | 1/2018 | Rehwald et al. | |
| 2014/0102415 A1 | * | 4/2014 | Wyban | ................. F02M 55/025 123/456 |
| 2016/0245252 A1 | * | 8/2016 | Hayman | ................. F02D 19/06 |
| 2018/0003203 A1 | * | 1/2018 | Kochanski | ............. F16B 43/00 |

* cited by examiner

*Primary Examiner* — George C Jin
(74) *Attorney, Agent, or Firm* — Oblon, McClelland, Maier & Neustadt

(57) ABSTRACT

A clamping assembly and components, systems, and methods thereof can comprise a first clamp adapted to be provided around a first fuel line for an internal combustion engine to rigidly clamp the first fuel line to a bracket arrangement; and a second clamp adapted to be provided around a second fuel line for the internal combustion engine, which is spaced from the first fuel line, to clamp the second fuel line to the bracket arrangement such that the second fuel line is movable according to a degree of freedom in a direction of assembly strain. The second clamp can include a bent clip, and the first and second clamps can be aligned with each other or offset by no more than a body length of either the first clamp or the second clamp.

20 Claims, 5 Drawing Sheets

CLAMPING ASSEMBLY FOR A PAIR OF FUEL LINES AND COMPONENTS, SYSTEMS, AND METHODS THEREOF

TECHNICAL FIELD

The present disclosure relates to a clamping assembly, and more particularly to a clamping assembly for a pair of fuel lines, and components, systems, and methods thereof.

BACKGROUND

Standard double tube clamps used on fuel rails can create assembly strain or stress due to part tolerances. Assembly stress can lead to intolerance of vibrational loads (e.g., undesirable resonant respond condition) caused by vibration of an internal combustion engine to which the fuel rails are connected and can be detrimental to fuel rail fatigue life.

U.S. Pat. No. 9,453,485 ("the '485 patent") describes a fuel rail assembly with bracket and isolator for mounting. The bracket is to attach the fuel rail assembly to the engine and includes a fuel rail portion defining a first passage extending therethrough in the same direction as the fuel rail axis for receiving the fuel rail therewithin. The bracket also includes a mounting portion adjacent to the fuel rail portion that defines a second passage extending therethrough in the same direction as the fuel rail axis. According to the '485 patent, the mounting portion is configured to receive a fastener for securing the fuel rail assembly to the engine.

SUMMARY OF THE DISCLOSURE

In one aspect, the present disclosure describes a clamping assembly for fuel lines of an internal combustion engine. The clamping assembly can comprise: a first clamp adapted to be provided around a first fuel tube for the internal combustion engine to rigidly clamp the first fuel tube to a bracket arrangement; and a second clamp adapted to be provided around a second fuel tube for the internal combustion engine, which is spaced from the first fuel tube in a vertical direction, to clamp the second fuel tube to the bracket arrangement such that the second fuel tube is movable according to a degree of freedom in a direction of assembly strain. The second clamp can include a bent clip, the first and second clamps can be vertically aligned with each other or offset by no more than a body length of either the first clamp or the second clamp, and the direction of assembly strain can have the vertical direction as a primary component and a horizontal direction as a secondary component.

In another aspect, the present disclosure describes a method regarding a clamp assembly. The method can comprise: providing a first clamp, the first clamp being adapted to be provided around a first fuel line for an internal combustion engine and not a second fuel line for the internal combustion engine that runs parallel to the first fuel line, and the first clamp being adapted to rigidly clamp the first fuel line to a bracket arrangement via a first fastener; and providing a second clamp, the second clamp being adapted to be provided around the second fuel line and not the first fuel line, and the second clamp being adapted to clamp the second fuel tube to the bracket arrangement via a second fastener such that the second fuel line is movable according to a degree of freedom in a vertical direction of assembly strain. The first fuel line can be spaced from the second fuel line by a predetermined distance. The second clamp can be offset from the first clamp in a length direction of the second fuel line. The second clamp can include a bent clip.

In yet another embodiment, an assembly for an internal combustion engine is described. The assembly can comprise: a bracket arrangement disposed vertically; a first fuel tube disposed horizontally at a first side of the bracket arrangement; a second fuel tube disposed horizontally at the first side of the bracket arrangement, the second fuel tube being directly below the first fuel tube and separated from the first fuel tube by a predetermined distance; a first clamp provided around the first fuel tube and not the second fuel tube, the first clamp rigidly clamping the first fuel tube to the bracket arrangement via a first bolt; and a second clamp provided around the second fuel tube and not the first fuel tube, the second clamp clamping the second fuel tube to the bracket arrangement via a second bolt such that the second fuel tube is movable according to a degree of freedom in a vertical direction of assembly strain caused by vibration of the internal combustion engine. The first fuel tube and the second fuel tube can be fixedly connected via welding to a block of the assembly for the internal combustion engine. The second clamp can include a U-shaped clip and a spacer with a counterbore feature fixed to the U-shaped clip, a retaining washer being provided in the counterbore feature. The second bolt can be provided through openings in the opposing legs of the U-shaped clip, through an opening of the spacer, through the retaining washer, and removably coupled to the bracket arrangement.

Other features and aspects of this disclosure will be apparent from the following description and the accompanying drawings.

DETAILED DESCRIPTION

The present disclosure relates to a clamping assembly for a pair of fuel lines, and components, systems, and methods thereof.

Figure 1:
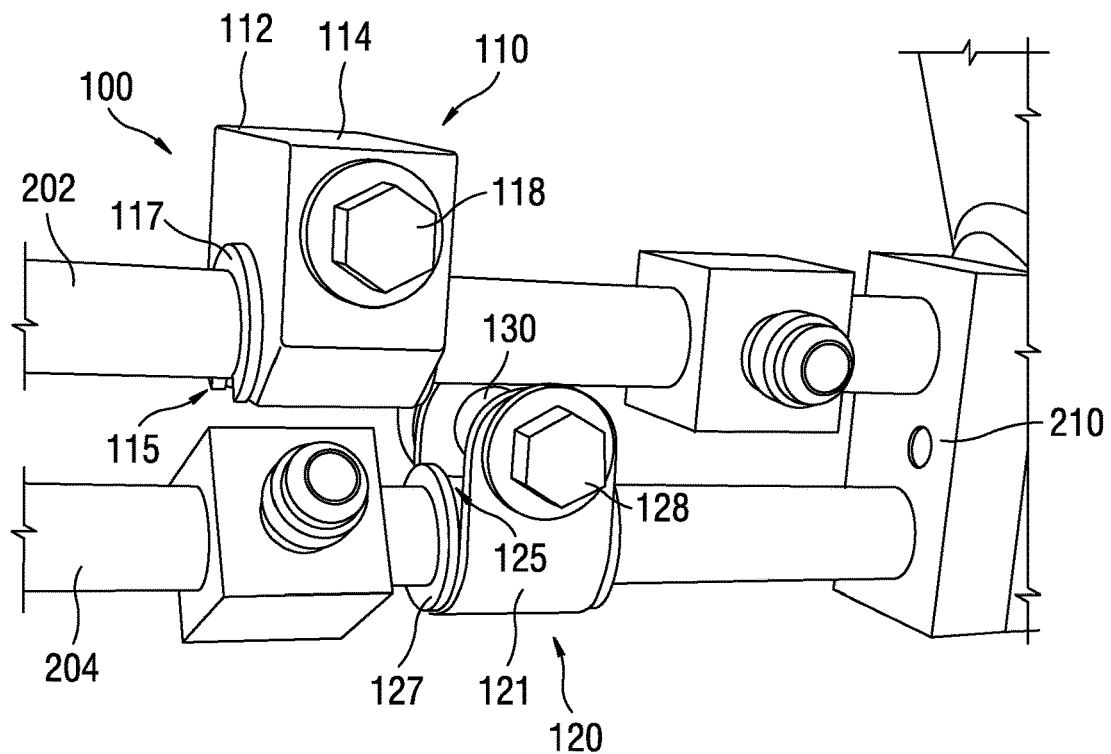
FIG. 1 shows a clamping assembly from a first side according to one or more embodiments of the disclosed subject matter.
Figure 2:
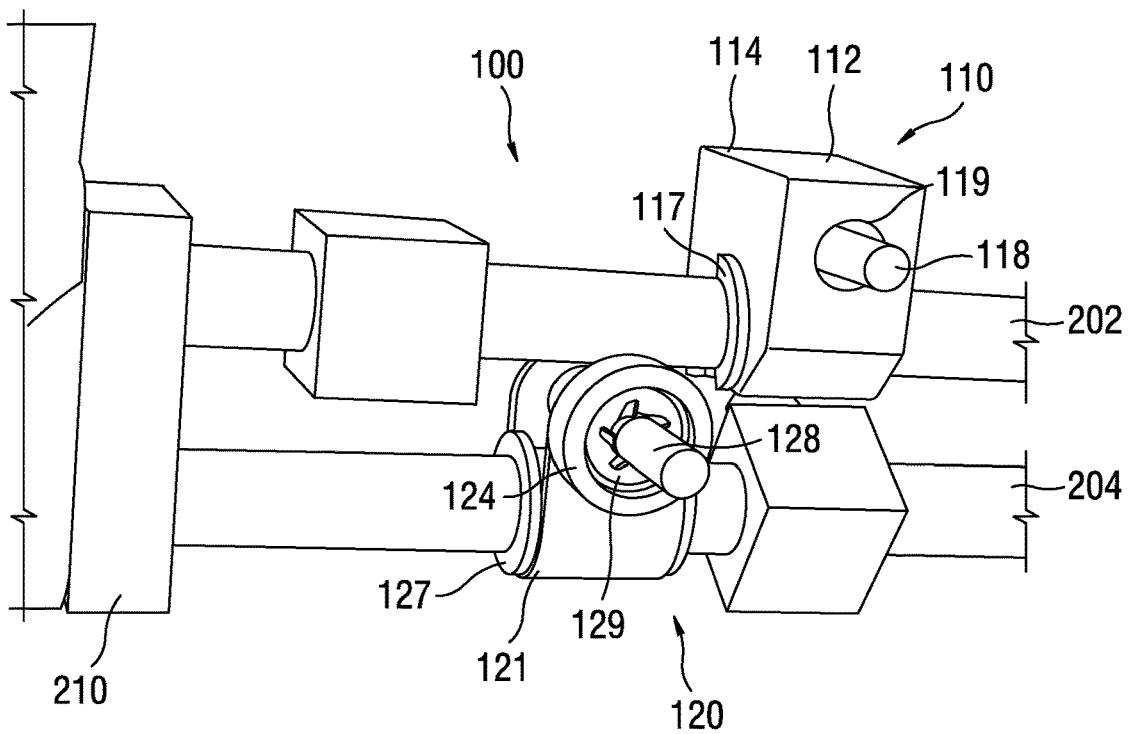
FIG. 2 shows the clamping assembly from a second side opposite the first side.

FIG. 1 and FIG. 2 show a clamping assembly 100 from first and second sides, respectively, according to one or more embodiments of the disclosed subject matter. The clamping assembly 100 can be to clamp a pair of tubes comprised or consisting of a first tube 202 and a second tube 204. The first tube 202 and the second tube 204 can be tubes to transmit fuel to an internal combustion engine (not shown). Hence, the first tube 202 may be referred to as a first fuel line 202. Likewise, the second tube 204 may be referred to as a second fuel line 204. Optionally, the first fuel line 202 and the second fuel line 204 can have a same outer diameter. The first fuel line 202 and the second fuel line 204 can be part of a fuel rail, a portion of which is shown in FIG. 1 and FIG. 2.

The clamping assembly 100 can be comprised of a first clamp 110 and a second clamp 120. Optionally, the clamping assembly 100 may be characterized as consisting of the first clamp 110 and the second clamp 120 and corresponding interface and connection components (discussed in more detail below). The first clamp 110 and the second clamp 120 can be adapted to be provided around the first fuel line 202 and the second fuel line 204, respectively. Moreover, as can be seen from FIG. 1 and FIG. 2, the first clamp 110 may not be provided around the second fuel line 204 and the second clamp 120 may not be provided around the first fuel line 202.

Figure 3:
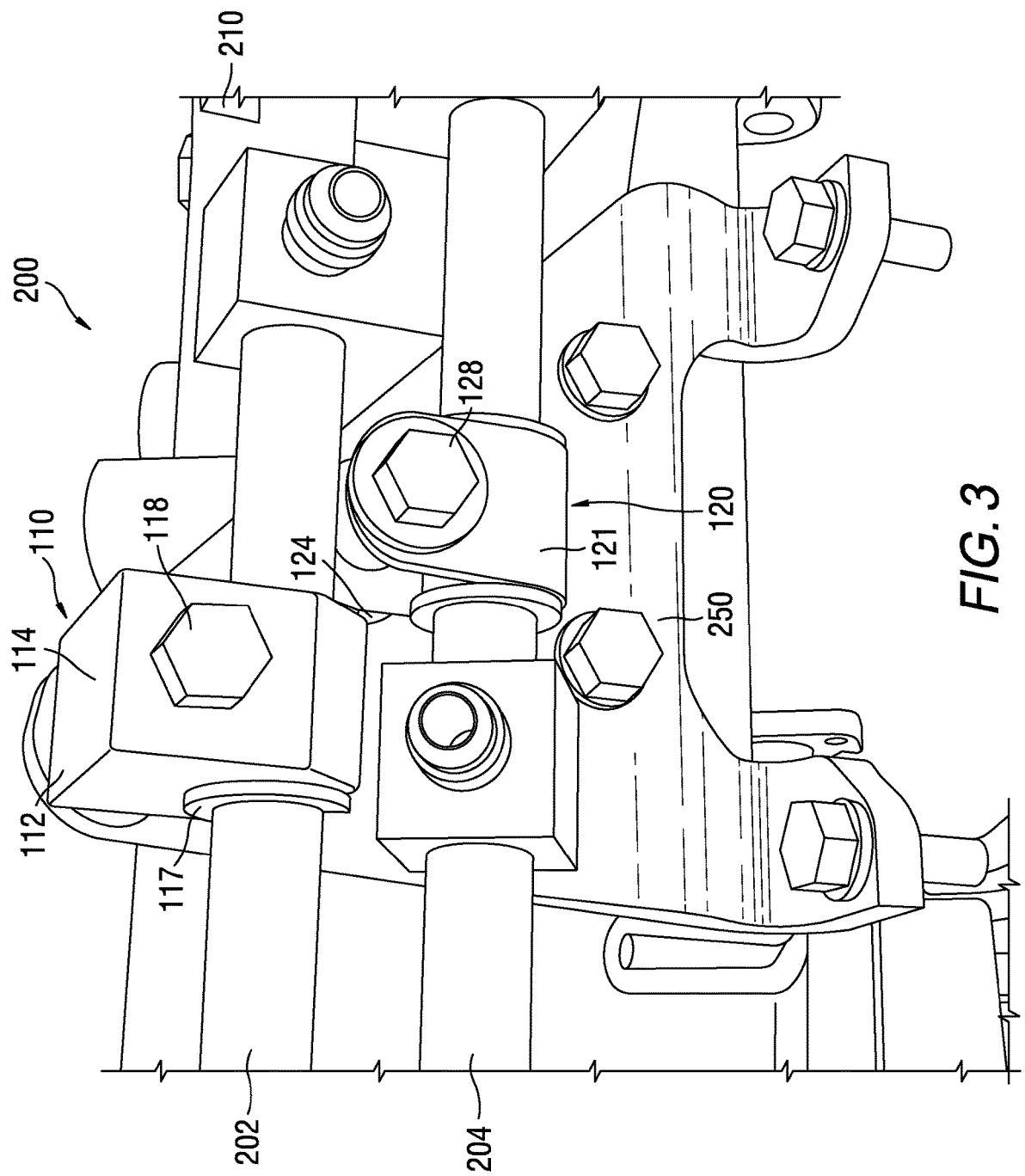
FIG. 3 shows an assembly for an internal combustion engine from a first side according to one or more embodiments of the disclosed subject matter.

Referring to FIG. 3, which shows an assembly 200 for an internal combustion engine (not expressly shown) according to one or more embodiments of the disclosed subject matter, the first fuel line 202 and the second fuel line 204 can be spaced from each other by a predetermined distance. The predetermined distance may be based on connections of the first fuel line 202 and the second fuel line 204 in the context of the assembly 200. For instance, the first fuel line 202 and the second fuel line 204 may be fixedly connected (e.g., via welding) at ends thereof to a block 210 for the passage of fuel between the block 210 and the first and second fuel lines 202, 204 (not expressly shown, the block 210 can be connected to other components of the assembly 200). As an example, the spacing of the first fuel line 202 from the second fuel line 204 can be based on the length of the block 210. Optionally, as shown in FIGS. 1-3, for instance, the spacing between the first fuel line 202 and the second fuel line 204 can be based on an amount by which the second clamp 120 extends from the second fuel line 204.

According to one or more embodiments, the first fuel line 202 and the second fuel line 204 can run parallel to each other, at least for portions thereof associated with the first clamp 110 and the second clamp 120. Optionally, the first fuel line 202 and the second fuel line 204 may extend or be disposed horizontally. According to one or more embodiments, the first and second fuel lines 202, 204 may be provided in an over-under arrangement, for instance, where the first fuel line 202 is above or over the second fuel line 204. Optionally, the first fuel line 202 may be directly over the second fuel line 204. Thus, one of the first fuel line 202 or the second fuel line 204 may be provided at a first height and the other of the first fuel line 202 or the second fuel line 204 may be provided at a second height less than or below the first height. FIGS. 1-3, for instance, show the first fuel line 202 at a height above the second fuel line 204.

As shown in FIG. 3, a first fastener 118 may removably couple the first clamp 110 to a bracket arrangement 250, and a second fastener 128 may removably couple the second clamp 120 to the bracket arrangement 250. As a non-limiting example, the first fastener 118 and the second fastener 128 may be bolts (e.g., with washers). According to one or more embodiments, the first fastener 118 and the second fastener 128 may be considered part of the first clamp 110 and the second clamp 120, respectively. Thus, the first fastener 118 and the second fastener 128 may be referred to herein as a first bolt 118 and a second bolt 128, respectively.

In that the first fuel line 202 and the second fuel line 204 may be at different heights and the first clamp 110 and the second clamp 120 can be removably coupled to the first fuel line 202 and the second fuel line 204, it logically follows that the first and second clamps 110, 120 can be at different heights. For instance, FIGS. 1-3 show the first clamp 110 being above the second clamp 120.

Optionally, the first clamp 110 and the second clamp 120 may be offset from each other in a length direction of the first fuel line 202 and/or the second fuel line 204, such as shown in FIGS. 1-3. For instance, according to one or more embodiments, the first clamp 110 may be offset from the second clamp 120 in the length direction by no more than a body length of either the first clamp 110 or the second clamp 120 in the length direction. Alternatively, the first clamp 110 and the second clamp 120 may not be offset from each other, for instance, vertically aligned with each other.

As shown in FIG. 3, the first fuel line 202 and the second fuel line 204 can be provided at a first side of the bracket arrangement 250, wherein the bracket arrangement 250 may be oriented or disposed vertically, at least in part. Generally, the first clamp 110 can clamp the first fuel line 202 to the bracket arrangement 250, and the second clamp 120 can clamp the second fuel line 204 to the bracket arrangement 250.

FIG. 3 shows the bracket arrangement 250 being a single bracket. Hence, the first clamp 110 and the second clamp 120 can be removably coupled to the same bracket according to one or more embodiments of the disclosed subject matter. Alternatively, the bracket arrangement 250 can be comprised of more than one bracket, one for the first clamp 110 and another for the second clamp 120.

The first clamp 110 may have a body, which may be formed or made of aluminum, that defines a receptacle 115 provided around at least part of the first fuel line 202. Generally, the receptacle 115 may be defined by surfaces of the body of the first clamp 110 that conform to the shape of the first fuel line 202 or an intervening component, such as a first grommet 117. Thus, according to embodiments of the disclosed subject matter, the body of the first clamp 110 may directly contact the first fuel line 202, or, alternatively, an intervening component, such as the first grommet 117, may be provided around at least part of the first fuel line 202, between the body of the first clamp 110 and the first fuel line 202. The first grommet 117 may be made of an elastomer, such as rubber, and the body of the first clamp 110 may compress the first grommet 117 when the first clamp 110 is provided around the first fuel line 202 and clamps the first fuel line 202 to the bracket arrangement 250.

According to one or more embodiments, the body of the first clamp 110 can be comprised of two body portions, a first body portion 112 and a second body portion 114. The first body portion 112 and the second body portion 114 may be held together when arranged around the first clamp 110 by way of the first fastener 118 provided through aligned holes or bores 119 in the first body portion 112 and the second body portion 114 and to a corresponding interface (e.g., threaded opening) in the bracket arrangement 250. Optionally, the first fastener 118 and/or the first grommet 117 may be considered part of the first clamp 110.

Figure 4A:
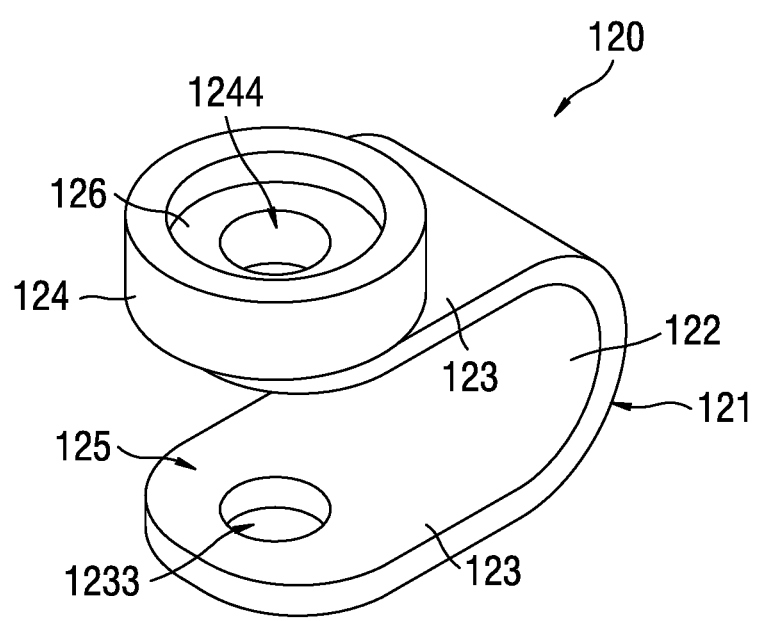
FIG. 4A is a perspective view of a clamp of a clamping assembly according to one or more embodiments of the disclosed subject matter.
Figure 4B:
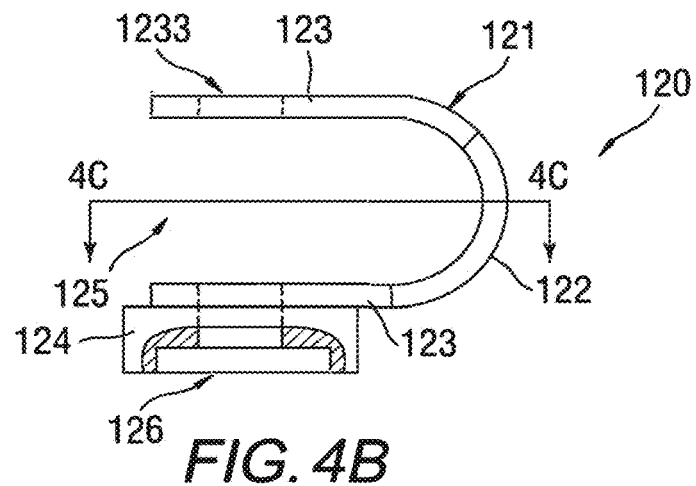
FIG. 4B is a side elevational view of the clamp of FIG. 4A.

Turning to FIGS. 4A-4D, the second clamp 120 can include or have a body in the form of a bent clip 121 that defines a receptacle 125 provided around at least part of the second fuel line 204. Generally, the receptacle 125 may be defined by a bent base portion 122 and at least a portion of opposing legs 123 of the bent clip 121 that conform, at least in part, to the shape of the second fuel line 204 or an intervening component, such as a second grommet 127. As a non-limiting example, the bent clip 121 may be a U-shaped clip, such as shown in FIG. 4A and FIG. 4B. Alternatively, the bent base portion 122 may have a square or rectangular geometry with right angles leading to the opposing legs 123.

Thus, according to embodiments of the disclosed subject matter, the bent clip 121 may directly contact the second fuel line 204, or, alternatively, an intervening component, such as the second grommet 127, may be provided around at least part of the second fuel line 204, between the bent clip 121 and the second fuel line 204. The second grommet 127 may be made of an elastomer, such as rubber, and bent clip 121 may be made or formed of steel. The bent clip 121 may compress the second grommet 127 when the second clamp 120 is provided around the second fuel line 204 and clamps the second fuel line 204 to the bracket arrangement 250.

Optionally, the second clamp 120 may have a spacer 124. The spacer 124, which may be made or formed of steel, may be cylindrical and can be provided on an outer surface of one of the legs 123 of the bent clip 121, such as shown in FIGS. 4A-4D. According to one or more embodiments, the spacer 124 may be fixed to the outer surface of one of the legs 123. For instance, the spacer 124 may be fixed to the outer surface of the leg 123 by welding (e.g., tack welding), press fit, brazing, an adhesive, etc. Alternatively, the spacer 124 may be held in place by the second fastener 128 when the second fastener 128 is removably coupled to a corresponding interface (e.g., threaded opening) in the bracket arrangement 250. According to one or more embodiments, and as shown in FIG. 3, the spacer 124 may be provided at the outer surface of the leg 123 closest to the bracket arrangement 250 when the second fastener 128 is removably coupled to a corresponding interface (e.g., threaded opening) in the bracket arrangement 250.

Figure 4C:
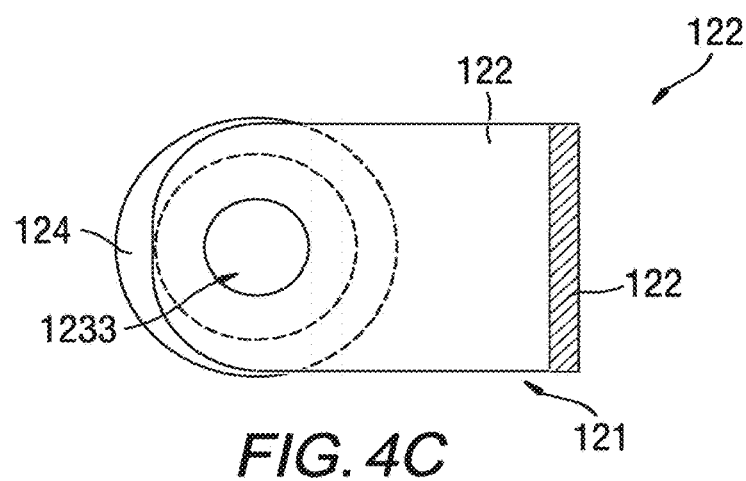
FIG. 4C is a top plan view of the clamp of FIG. 4A.
Figure 4D:
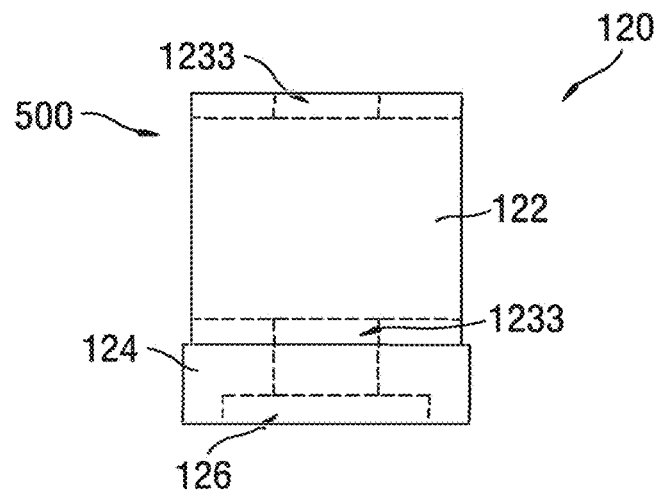
FIG. 4D is an end elevational view of the clamp of FIG. 4A.

The spacer 124 may have a counterbore feature 126, such as shown in FIGS. 4A, 4B, and 4C. Generally, the counterbore feature 126 can provide an enlarged recess in the spacer 124 to receive a retaining washer 129 that can be provided around a shaft of the second fastener 128, such as shown in FIG. 2. The retaining washer 129 can engage the second fastener 128, such as shown in FIG. 2.

The second fastener 128 can be provided through openings 1233 in the opposing legs 123 of the bent clip 121, through an opening 1244 of the spacer 124, and through the retaining washer 129, such as shown in FIG. 1 and FIG. 2. Optionally, a washer may be provided between a corresponding outer surface of one of the legs 123 and a head of the second fastener 128 in the form of a bolt. As shown in FIG. 3, the second fastener 128 can be removably coupled to a corresponding interface (e.g., threaded opening) in the bracket arrangement 250. Optionally, a sleeve 130 may be provided around a middle portion of the second fastener 128, between the opposing legs 123 of the bent clip 121. Generally, the sleeve 130 can be for bolt stretch and may control compression of the second grommet 127 (e.g., set to 6%-12% compression). According to one or more embodiments, the second fastener 128, the retaining washer 129, and/or the sleeve 130 may be considered part of the second clamp 120.

INDUSTRIAL APPLICABILITY

As noted above, the present disclosure relates to clamping assemblies for a pair of fuel lines, and components, systems, and methods thereof.

Figure 5:
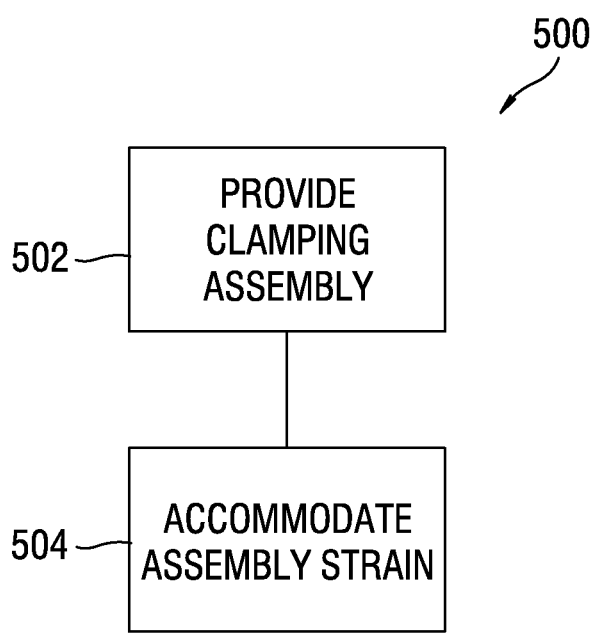
FIG. 5 is a flow chart of a method according to embodiments of the disclosed subject matter.

FIG. 5 is a flow chart of a method 500 according to embodiments of the disclosed subject matter.

At 502 the method 500 can include providing a clamping assembly, such as clamping assembly 100, according to embodiments of the disclosed subject matter. The clamping assembly 100 can be provided in the context of a larger assembly, such as assembly 200, for an internal combustion engine (not expressly shown) according to one or more embodiments of the disclosed subject matter.

As noted above, the clamping assembly 100 can have a first clamp 110 and a second clamp 120. The first and second clamps 110, 120 can be provided around (fully or partially) the first and second fuel lines 202, 204, respectively, such as described above. In this regard, the first clamp 110 is not provided around the second fuel line 204 and the second clamp 120 is not provided around the first fuel line 202.

The first and second clamps 110, 120 can clamp the first and second fuel lines 202, 204 to a bracket arrangement of the assembly 200, such as bracket arrangement 250. The first and second fuel lines 202, 204, at ends thereof, can be fixed (e.g., welded) to a block of the assembly 200, such as block 210. The clamping of the first clamp 110 to the first fuel line 202 may be characterized as rigidly clamped (e.g., no degree of freedom or no degree of freedom to accommodate assembly strain), whereas the clamping of the second clamp 120 to the second fuel line 204 may be characterized as movable in that the second clamp 120 can accord a degree of freedom for the second fuel line 204. Discussed in more detail below, the degree of freedom may be in one or more directions of assembly strain caused vibration of the internal combustion engine and a corresponding effect on the block 210 and first and second fuel lines 202, 204 fixed thereto.

At 504 the method 500 can include accommodating assembly strain for the first fuel line 202 and the second fuel line 204 via the clamping assembly 100, particularly the first clamp 110 and the second clamp 120 thereof, and, consequently, accommodating corresponding resonant response that may be applicable to adjoined tubes (e.g., first and second fuel lines 202, 204 adjoined to block 210). Accommodating assembly strain can involve elimination or reduction of assembly strain for the first and second fuel lines 202, 204 and associated component or components connected to the first and second fuel lines 202, 204, such as block 210. Elimination or reduction of assembly strain, in turn, can eliminate or reduce the resonant response of the first and second fuel lines 202, 204 fixed to the block 210.

Assembly strain may be caused by vibration (at multiple frequencies) of the internal combustion engine when the internal combustion engine is operating. More specifically, such vibration of an internal combustion engine during operation can lead to a forcing function that generates corresponding energy by the block 210. Assembly strain can act as a conduit for the transference of the energy, wherein the greater the assembly strain the greater the transference of the energy. In the event of a resonating condition, the greater the transference of energy into the resonating condition the greater the resonant response (i.e., the resonant response can be amplified). As an example, this can lead to stress and failure of the welds where the ends of the first and second fuel lines 202, 204 are welded to the block 210.

As discussed above, embodiments of the disclosed subject matter can reduce or eliminate assembly strain by rigidly clamping the first fuel line 202 via the first clamp 210 and movably clamp the second fuel line 204 via the second clamp 220. The second clamp 220 can allow a degree of freedom in the direction of assembly strain for the second fuel line 204. Hence, the first fuel line 202 and the second fuel line 204 coupled at their ends to the block 210 may not be driven together toward each other or away from each other. Rather, the second clamp 220 can allow the second fuel line 204 freedom to move in the direction of the assembly strain. According to one or more embodiments, the direction of the assembly strain may be in the vertical direction. For instance, the direction of the assembly strain may have the vertical direction as a primary component and the horizontal direction as a secondary component. That is, the direction may have both a vertical component and a horizontal component, but the vertical component may be greater than the horizontal component.

Accordingly, clamping assemblies according to embodiments of the disclosed subject matter, such as clamping assembly 100, can allow for variation in tolerances for the direction of concern while fitting within relatively tight space constraints and allowing for ease of assembly. Such clamping assemblies can reduce or eliminate assembly strain, as noted above, which can reduce or eliminate dynamic response and lower dynamic strain. This can improve fuel line/rail fatigue life and allow higher vibrational loads to be withstood with a reduction in assembly stress.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof

The invention claimed is:

1. An assembly for an internal combustion engine comprising:
   a bracket arrangement disposed vertically;
   a first fuel tube disposed horizontally at a first side of the bracket arrangement;
   a second fuel tube disposed horizontally at the first side of the bracket arrangement, the second fuel tube being directly below the first fuel tube and separated from the first fuel tube by a predetermined distance;
   a first clamp provided around the first fuel tube and not the second fuel tube, the first clamp rigidly clamping the first fuel tube to the bracket arrangement via a first bolt; and
   a second clamp provided around the second fuel tube and not the first fuel tube, the second clamp clamping the second fuel tube to the bracket arrangement via a second bolt such that the second fuel tube is movable according to a degree of freedom in a vertical direction of assembly strain caused by vibration of the internal combustion engine,
   wherein the first fuel tube and the second fuel tube are fixedly connected via welding to a block of the assembly for the internal combustion engine,
   wherein the second clamp includes a U-shaped clip and a spacer with a counterbore feature fixed to the U-shaped clip, a retaining washer being provided in the counterbore feature, and
   wherein the second bolt is provided through openings in the opposing legs of the U-shaped clip, through an opening of the spacer, through the retaining washer, and removably coupled to the bracket arrangement.

2. The internal combustion engine assembly according to claim 1, wherein the bracket arrangement is a single bracket to which the first clamp and the second clamp are removably coupled via the first bolt and the second bolt, respectively.

3. The internal combustion engine assembly according to claim 1, wherein the vertical direction of assembly strain has the vertical direction as a primary component and a horizontal direction as a secondary component.

4. The internal combustion engine assembly according to claim 1, further comprising:
   a first grommet around the first fuel tube, between the first fuel tube and the first clamp; and
   a second grommet around the second fuel tube, between the second fuel tube and the second clamp,
   wherein each of the first grommet and the second grommet is made of an elastomer.

5. The internal combustion engine assembly according to claim 1, wherein the spacer is fixed to an outer surface of one of the legs of the U-shaped clip on a side of the U-shaped clip closest to the bracket arrangement.

6. The internal combustion engine assembly according to claim 1, wherein the second clamp is offset from the first clamp in a length direction of the second fuel tube.

7. The internal combustion engine assembly according to claim 1, wherein the first clamp is comprised of aluminum and the second clamp is comprised of steel.

8. A method comprising:
   providing a first clamp, the first clamp being adapted to be provided around a first fuel line for an internal combustion engine and not a second fuel line for the internal combustion engine that runs parallel to the first fuel line, and the first clamp being adapted to rigidly clamp the first fuel line to a bracket arrangement via a first fastener; and
   providing a second clamp, the second clamp being adapted to be provided around the second fuel line and not the first fuel line, and the second clamp being adapted to clamp the second fuel tube to the bracket arrangement via a second fastener such that the second fuel line is movable according to a degree of freedom in a vertical direction of assembly strain,
   wherein the first fuel line is spaced from the second fuel line by a predetermined distance,
   wherein the second clamp is offset from the first clamp in a length direction of the second fuel line, and
   wherein the second clamp includes a bent clip.

9. The method according to claim 8,
   wherein the first and second clamps clamp the first and second fuel lines, respectively, to the bracket arrangement, the first and second fuel lines also being fixedly coupled to a block of an assembly of the internal combustion engine, and
   wherein the method further comprises accommodating assembly strain due to vibration of the internal combustion engine based on the degree of freedom in the vertical direction of the assembly strain.

10. The method according to claim 9, wherein the bracket arrangement is a single bracket to which the first clamp and the second clamp are removably coupled via the first fastener and the second fastener, respectively.

11. The method according to claim 9, wherein the vertical direction of assembly strain has the vertical direction as a primary component and a horizontal direction as a secondary component.

12. The method according to claim 9, wherein a spacer is fixed to an outer surface of a leg of the bent clip on a side of the bent clip closest to the bracket arrangement.

13. The method according to claim 9, wherein the first clamp is provided at a first height in the assembly of the internal combustion engine and the second clamp is provided at a second height in the assembly of the internal combustion engine below the first height.

14. The method according to claim 9, wherein the first clamp is made of aluminum and the second clamp is made of steel.

15. A clamping assembly for fuel tubes of an internal combustion engine comprising:
- a first clamp adapted to be provided around a first fuel tube for the internal combustion engine to rigidly clamp the first fuel tube to a bracket arrangement; and
- a second clamp adapted to be provided around a second fuel tube for the internal combustion engine, which is spaced from the first fuel tube in a vertical direction, to clamp the second fuel tube to the bracket arrangement such that the second fuel tube is movable according to a degree of freedom in a direction of assembly strain,
- wherein the second clamp includes a bent clip,
- wherein the first and second clamps are vertically aligned with each other or offset by no more than a body length of either the first clamp or the second clamp, and
- wherein the direction of assembly strain has the vertical direction as a primary component and a horizontal direction as a secondary component.

16. The clamping assembly according to claim 15, wherein the second clamp further includes a spacer with a counterbore feature fixed to an outer surface of a leg of the bent clip.

17. The clamping assembly according to claim 15, wherein the first clamp is adapted to be provided around the first fuel tube and not around the second fuel tube when provided around the first fuel tube, and the second clamp is adapted to be provided around the second fuel tube and not around the first fuel tube when provided around the second fuel tube.

18. The clamping assembly according to claim 15, further comprising:
- a first fastener adapted to extend entirely through the first clamp to interface with the bracket arrangement; and
- a second fastener adapted to extend entirely through the bent clip of the second clamp to interface with the bracket arrangement.

19. The clamping assembly according to claim 15, wherein the bent clip is a U-shaped clip, and wherein the clamping assembly further comprises:
- a spacer with a counterbore feature fixed to a leg of the U-shaped clip; and
- a retaining washer adapted to be provided in the counterbore feature.

20. The clamping assembly according to claim 19, wherein the first clamp is made of aluminum, the U-shaped clip is made of steel, and the spacer is made of steel.

* * * * *